United States Patent Office 2,781,248
Patented Feb. 12, 1957

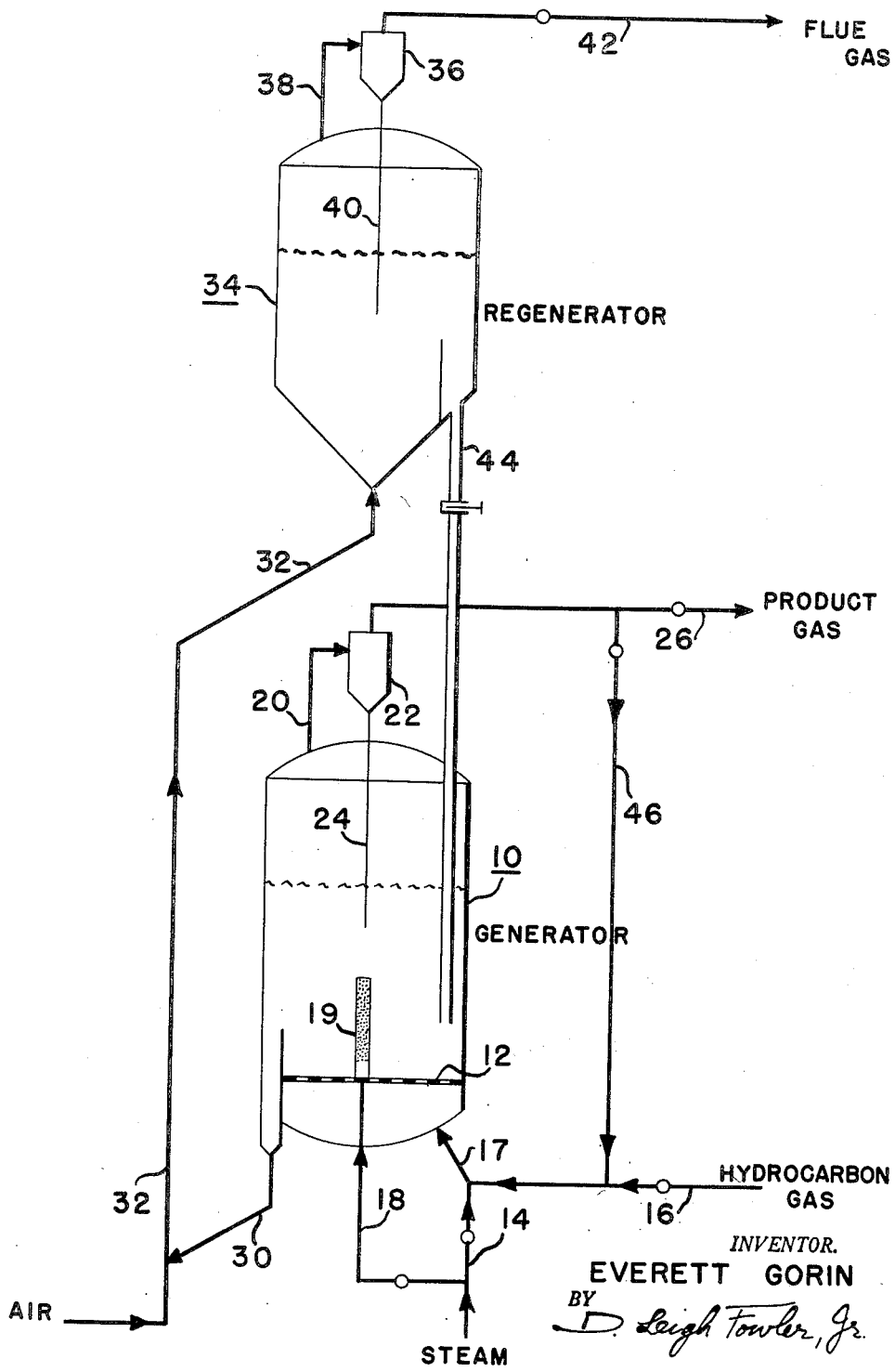

2,781,248

MANUFACTURE OF HYDROGEN

Everett Gorin, Pittsburgh, Pa., assignor to Pittsburgh Consolidation Coal Company, Pittsburgh, Pa., a corporation of Pennsylvania Application January 6, 1953, Serial No. 329,773

2 Claims. (Cl. 23—212)

This invention relates to the manufacture of hydrogen and, more particularly, to a method of making hydrogen by reacting a gaseous hydrocarbon with steam.

The present application is a continuation-in-part of my copending application, Serial Number 116,546, filed September 19, 1949, now abandoned, and assigned to the assignee of the present invention.

It has been proposed to prepare hydrogen by reacting hydrocarbons with steam in the presence of sufficient calcium oxide to absorb substantially all the carbon dioxide produced. The calcium oxide serves a dual purpose in such a reaction. Firstly, by absorption of the carbon dioxide produced in the reaction, a purer hydrogen gas is made. Secondly, by virtue of the exothermic character of the lime-carbon dioxide reaction to form calcium carbonate, part or all of the heat required to maintain the endothermic hydrocarbon-steam reaction is provided. While this reaction will proceed over a wide range of temperatures and pressures, for optimum results with respect to the combined factors of steam conversion, thermo-neutrality and hydrogen purity, a temperature range of 1400 to 1750° F. and a pressure range of 20 to 50 atmospheres are preferred.

In order to operate the above process in a single vessel in a continuous manner, it is necessary to feed calcium oxide continuously into the reaction zone to replace calcium carbonate which is formed during the reaction. The calcium carbonate is regenerated in a separate vessel. The fluidized solids technique provides a practical way of accomplishing the continuous feeding and withdrawal of solids. The employment of this technique in the reaction vessel promotes optimum mixing of reactants and transfer of heat. For these reasons a fluidized system was selected as the commercially practicable way to conduct the hydrocarbon-steam reaction in the presence of lime.

Unfortunately, an unexpected difficulty was encountered in using a fluidized system in the preferred ranges of temperature and pressure specified above. The fluidized bed of solids containing the calcium oxide rapidly agglomerated to a gas impermeable mass. Continuous operation became impossible. The cause of this phenomenon was not readily apparent and, for that matter, is not yet clearly established. According to the literature, lime does not form a hydrate above 1100° F. Yet the agglomerate formation observed under the above conditions could only be attributed to some fusible complex. Whatever the cause, however, it was imperative for continuous operation of the process to provide a solution, that is, some way of preventing the formation of non-fluidizable agglomerates.

In accordance with the present invention, the formation of non-fluidizable agglomerates in the above described reaction system is avoided while still maintaining the preferred conditions of temperature i. e. 1400 to 1750° F.; of pressure i. e. 20 to 50 atmospheres; of fluidization; and of sufficient calcium oxide to absorb the carbon dioxide produced. This result is achieved by maintaining the partial pressure of steam below about 13 atmospheres throughout the reaction zone. A steam pressure of this order is critical not because agglomeration ceases entirely below this level but because of a sharp change in the nature of the agglomerates. Below the critical pressure the agglomerates are weak and friable and are easily broken up by intensifying the fluidizing action. At steam pressures above this value hard-fused agglomerates are formed which cannot be broken up by intense fluidization and which rapidly lead to an inoperable condition. It has been found furthermore that within the range specified above, the critical steam pressure is for all practical purposes independent of the temperature. The critical pressure was also found to be substantially the same for other rich lime bearing minerals that were used instead of lime in the process such as dolomite.

In order to ensure that the partial pressure of steam does not exceed the critical value at any point within the reaction zone, it is necessary to place the same steam partial pressure restriction upon the gases introduced into the reaction zone. This is so because, despite the agitated state of a fluidized bed, there is still a brief interval of time before newly admitted gases are completely mixed with the solids in the reaction zone. This interval of time is sufficient for agglomeration to non-fluidizable particles to occur at or near the inlet point.

It is generally desirable to feed the steam and hydrocarbon gas to the reaction zone in the ratio of at least 2 to 1. In order to do this and at the same time meet all the conditions of temperature, total pressure and partial pressure of steam specified above, one of the following procedures may be adopted. Firstly, steam and hydrocarbon gas in such relative proportions as to meet the steam partial pressure restriction are introduced into the bottom of the reaction zone. The balance of the steam required to meet the steam-hydrocarbon ratio of at least 2 to 1 is introduced directly into the interior of the bed of fluidized calcium oxide at a plurality of points sufficient in number to ensure the maintenance of the steam partial pressure restriction. Additionally or alternately, a portion of the product gas may be recycled to be admixed with the feed stream of steam and hydrocarbon gas in sufficient amount to effect partially or completely the necessary regulation of the steam partial pressure.

Due to the relatively mild temperatures employed in my process, it is desirable to add catalytic agents. While the lime itself is a mild catalyst for the reaction, its catalytic activity can be supplemented by adding small amounts of more potent catalytic agents, particularly the metals of the first transition group Cu, Ni, Co and Fe disposed on suitable supports, i. e. copper on silica gel, Ni, Co or Fe on alumina, fused magnesia or silica gel. Alternatively, the catalyst may be incorporated directly on the lime by impregnation with aqueous solutions of the soluble salts, i. e., nitrates. Or nickel or stainless steel chips may be incorporated directly in the bed as a catalyst.

In order to conduct the reaction under conditions where the lime functions so as to absorb at least part of the carbon dioxide formed in the reaction, the reaction must be conducted above a minimum pressure which is correlated with the temperature of the generator. For each temperature within the range 1400 to 1750° F. there is a corresponding minimum pressure which must be maintained or exceeded. This relationship between the temperature and pressure is expressed by the following equation:

$$p = 3.0 + 1.94 \times 10^{-2}(t-1431) + 3.41 \times 10^{-4}(t-1431)^2$$

where $p$ is the minimum pressure in atmospheres and $t$ is temperature in °F. This relationship is automatically established in the range 1400 to about 1630 when the pressure is between 20 and 50 atmospheres. In the upper portion of the recited temperature range i. e. 1630° to 1750° F., however, the pressure must be in the upper portion of the recited pressure range if a proper $CO_2$ acceptor action is to be established.

The agglomeration of solids in the steam-carbon-lime system within the temperature and pressure ranges recited was completely unexpected. A study of the literature on this system developed no references bearing on the problem. Nor does the literature disclose the existence of any lime complex that might behave in this manner. A systematic study of the several parameters involved was therefore undertaken to determine the cause and its remedy, if any existed.

It was found that the agglomerates formed only when steam was present with both calcium oxide and calcium carbonate. The only function of carbon dioxide was to convert calcium oxide to carbonate. The agglomerates did not form in an atmosphere composed exclusively of steam if no $CaCO_3$ were present. It was also established that the agglomerates did not form when calcium carbonate, free of calcium oxide, was contacted with steam, or mixtures of steam and carbon dioxide. They were formed, however, when a mixture of calcium oxide and calcium carbonate was contacted with pure steam under the recited conditions of temperature and pressure. Even when a calcium oxide and carbonate mixture was diluted with as much as 90% by weight of sand a durable agglomerate resulted in the presence of steam. Inert diluents therefore offered no solution.

The above facts indicate that the agglomerate is a complex formed by the interaction of steam, calcium oxide and calcium carbonate. However, attempts to establish the exact identity of the agglomerate have so far been unsuccessful. In physical structure, it is a dense refractory mass, both cohesive and adhesive, and hard enough to resist a high speed metal drill. The original solid particles suffered a complete loss of identity in the agglomerate.

However, it was found unexpectedly during the course of this investigation that under certain conditions the physical character of the agglomerate changed. Instead of rock-like agglomerates, a tenuous, lacy matrix of particles which retained their original identity was formed. These particles were non-adhesive and extremely friable, crumbling under slight application of force. The cause of this change was traced finally to the partial pressure of the steam. An extended series of runs established that the steam partial pressure must not exceed about 13 atmospheres if the formation of non-fluidizable agglomerates is to be avoided. This critical value also was substantially independent of pressure and temperature within the previously recited ranges which in itself was quite surprising. Although the limitation as to maximum steam partial pressure does place a restriction upon the hydrocarbon-steam-lime system, nevertheless it is possible by accepting it to conduct the hydrocarbon-steam-lime reaction in a fluidized system under preferred conditions of operation and on a continuous basis.

For a better understanding of my invention, its objects and advantages, reference should be had to the following description and to the attached drawing, in which an apparatus for carrying out the preferred embodiment of my invention is diagrammatically illustrated.

In the following description of a specific embodiment of my invention, by way of example only, my new process is applied to the conversion of methane to hydrogen. It is to be understood, however, that my invention is generally applicable to any hydrocarbon gas which reacts with steam to produce hydrogen. Among such hydrocarbon gases are included such paraffins, methane, ethane, propane, butane, etc. Also included are hydrocarbon gases produced by the vaporization of liquid hydrocarbons at the temperatures of the reaction, as well as hydrocarbon gases resulting from the thermal decomposition or cracking of liquid or solid hydrocarbonaceous materials, such as coal tar pitch.

The apparatus shown in the drawing and its operation will now be described. Numeral 10 designates a reaction vessel adapted to serve as a high pressure hydrogen generator. A bed of calcium oxide is supported upon a porous plate member 12 disposed near the bottom of the vessel. The bed of lime is first brought to a temperature between 1400° and 1750° F. by any suitable means such as external heating of the vessel or by burning producer gas or pulverized coal within the vessel itself. As soon as this temperature is attained, steam and methane are introduced through valved conduits 14 and 16, respectively, and a common conduit 17 into the bottom of the vessel 10 at a point below the porous plate 12. Additional steam may be introduced into the interior of the bed of calcium oxide by means of valved conduit 18 which is connected at one end to steam line 14 and at the other end to a perforated pipe 19 centrally supported within the vessel 10 above the porous plate 12.

The total pressure within vessel 10 is maintained within the range of 20 to 50 atmospheres. In order to obtain the optimum conversion of methane consistent with efficient utilization of the steam, the relative proportions of total steam and methane preferably lie between 2 to 1 and 4 to 1.

The amount of lime contained in the bed is sufficient to absorb substantially all of the carbon dioxide produced as a result of the reaction between the steam and methane. Preferably, there are at least 250 parts by weight of the oxide for each 100 parts by weight of carbon contained in the methane passed through the bed. The particle size of the lime and the velocity of the steam and methane are regulated so that the bed of lime is maintained as a fluidized bed comprising a dense phase having a well-defined level above which there is a dilute phase.

The continued maintenance of a fluidizable bed of solids in vessel 10 is essential to the operation of the methane steam reaction on a continuous basis. It is therefore necessary, as stated previously, to maintain the partial pressure of steam below about 13 atmospheres throughout the reaction zone. Even though the partial pressure of steam in the product gas from vessel 10 is below this critical value, I have found that agglomeration of the lime to non-fluidizable particles occurs rapidly at the point of introduction of the steam if the partial pressure of the latter exceeds this critical value. This agglomeration takes place despite the rapid mixing of the feed gases in the agitated fluidized bed. Accordingly, the partial pressure of the steam in the mixture of steam and methane fed to vessel 10 through conduit 17 is maintained below about 13 atmospheres. Any additional steam required to establish the desired ratio of steam to methane fed to the generator is supplied through conduit 18 to the perforated distributing pipe 19. The latter is arranged to introduce steam at different levels within the bed of calcium oxide. The amount of steam fed at any level is controlled by the size and number of openings at any given level to ensure that upon entry into the reaction bed its partial pressure is below 13 atmospheres.

The reaction between the steam and methane at a temperature between 1400° and 1750° F. under pressures as specified above produces a gas containing principally hydrogen with relatively small amounts of carbon dioxide, carbon monoxide and unreacted methane. Substantially all of the carbon dioxide produced is absorbed by the lime in situ with resulting generation of heat. The latter serves to supply most of the heat required for the endothermic reaction between the steam and methane. Substantially all of the remaining heat is supplied as sensible heat of hot lime fed from the regenerator described below. Any additional heat required may be supplied in any suitable manner as by external heating of the walls of the vessel (not shown) or by burning the necessary amount of carbonaceous material within the vessel itself, that is, by feeding in limited amounts of oxygen. The product gas is conveyed from the vessel 10 by a conduit 20 which leads to a cyclone separator 22 where the gas is separated from entrained solids. The latter are then returned to the bed of lime by means of a dip leg 24. The solid free gas is conducted to any suitable storage place or to a subsequent processing stage through the valved conduit 26.

The regeneration of calcium oxide from the calcium carbonate in the above system is accomplished in the following manner. The carbonate is continuously withdrawn from the generator vessel 10 through a conduit 30, and is picked up by a stream of air circulating through a conduit 32. The air carries the carbonate to a regeneration vessel 34 which is adapted to confine a bed of solids at elevated temperatures. The bed of solids is maintained in a fluidized state by appropriate regulation of gas velocity through the bed. Heat is supplied to the bed by combustion of pulverized coal fed to the regenerator. Alternately the heat may be supplied by the combustion of gas such as producer or methane gas. The temperature maintained in the regenerator is a function of the pressure level and is in general higher the higher the pressure. Thus at atmospheric pressure a temperature of 1700° F. is satisfactory while if the regenerator is maintained at 20 atmospheres a temperature of at least 1900° F. must be maintained. The flue gas containing carbon dioxide produced in the regenerator is led to a cyclone separator 36 through a conduit 38 for removal of fine solids. The latter is returned to the bed of solids in the vessel 34 through a dip leg 40 while the char flue gas is discharged through a valved conduit 42. The hot regenerated calcium oxide is returned to the generator 10 through the valved conduit 44 which extends into the bed of lime maintained in that vessel.

If desired, instead of introducing additional steam into vessel 10 through the perforated pipe 19, or in addition thereto, in order to maintain the steam partial pressure below 13 atmospheres, a portion of the product gas flowing through a conduit 26 from the generator may be recycled through conduits 46, 16, and 17 to the generator. By suitable regulation of the relative proportions of recycled gas, steam and hydrocarbon gas, the desired steam partial pressure may be maintained.

In general, the product gas from generator 10 has the following composition by weight: hydrogen, 75–90%; CO, 1–12%; $CO_2$, 0.5–5%; $CH_4$, 2–15%. The hydrogen content of the gas decreases with increasing temperature and increases with increasing steam to methane feed ratio. The percent conversion of the steam ranges from 35 to 60% depending upon temperature and pressure, and presence or absence of catalyst.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of producing hydrogen from gaseous hydrocarbons and steam which comprises passing a gaseous hydrocarbon into a reaction zone maintained at a temperature between 1400 and 170° F. and at a total pressure which is between 20 and 50 atmospheres, maintaining an inventory of fluidized calcium oxide within said reaction zone under $CO_2$-absorbing conditions in an amount sufficient to absorb substantially all the carbon dioxide produced by reaction of said gaseous hydrocarbons with steam, introducing steam into said reaction zone in insufficient quantity to cause the partial pressure of steam to exceed 13 atmospheres whereby the partial pressure of steam at all points within said reaction zone is maintained below 13 atmospheres, the volume of steam thus introduced being at least twice the volume of gaseous hydrocarbons introduced into said reaction zone, and recovering the gaseous product of the reaction between said steam and said gaseous hydrocarbons.

2. The method of producing hydrogen from gaseous hydrocarbons and steam which comprises passing a gaseous hydrocarbon into a reaction zone maintained at a temperature between 1400 and 1750° F. and at a total pressure which is between 20 and 50 atmospheres, maintaining an inventory of fluidized calcium oxide within said reaction zone under $CO_2$-absorbing conditions in an amount sufficient to absorb substantially all the carbon dioxide produced by reaction of said gaseous hydrocarbons with steam, introducing steam into said reaction zone at at a plurality of vertically spaced points within said reaction zone in insufficient quantity to cause the partial pressure of steam to exceed 13 atmospheres whereby the partial pressure of steam at all points within said reaction zone is maintained below 13 atmospheres, the volume of steam thus introduced being at least twice the volume of gaseous hydrocarbons introduced into said reaction zone, and recovering the gaseous product of the reaction between said steam and said gaseous hydrocarbons.

References Cited in the file of this patent

UNITED STATES PATENTS

| 1,938,202 | Williams | Dec. 5, 1933 |
| 2,602,019 | Odell | July 1, 1952 |